(12) United States Patent
Block et al.

(10) Patent No.: US 7,716,971 B2
(45) Date of Patent: May 18, 2010

(54) METHOD AND SYSTEM FOR TESTING AN OVERSPEED PROTECTION SYSTEM DURING A TURBOMACHINE SHUTDOWN SEQUENCE

(75) Inventors: Frederick William Block, Campobello, SC (US); Mark P. Bombard, Amsterdam, NY (US); Michael J. Dell'Anno, Clifton Park, NY (US); Guillermo Garcia, Kennesaw, GA (US); Eamon Patrick Gleeson, Atlanta, GA (US); Kenneth Lee Leary, Anderson, SC (US); Richard Lee Nichols, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 758 days.

(21) Appl. No.: 11/584,095

(22) Filed: Oct. 20, 2006

(65) Prior Publication Data
US 2008/0095609 A1 Apr. 24, 2008

(51) Int. Cl.
*G01M 15/14* (2006.01)
(52) U.S. Cl. .................................................. 73/112.01
(58) Field of Classification Search ............. 73/112.01, 73/112.02, 112.03, 112.04, 112.05, 112.06
See application file for complete search history.

(56) References Cited

U.S. PATENT DOCUMENTS

| | | | | |
|---|---|---|---|---|
| 3,986,364 A | * | 10/1976 | Cronin et al. | 60/706 |
| 4,019,390 A | * | 4/1977 | Smith et al. | 73/865.9 |
| 4,217,617 A | * | 8/1980 | Rossi et al. | 361/51 |
| 4,667,114 A | * | 5/1987 | Rossi | 290/40 A |
| 5,292,225 A | * | 3/1994 | Dyer | 415/29 |
| 7,100,354 B2 | * | 9/2006 | Opper | 60/39.091 |
| 7,355,828 B2 | * | 4/2008 | Jones | 361/51 |
| 2005/0193715 A1 | * | 9/2005 | Opper | 60/39.091 |
| 2007/0013365 A1 | * | 1/2007 | Jones | 324/160 |
| 2008/0101918 A1 | * | 5/2008 | Block et al. | 415/30 |
| 2008/0213084 A1 | * | 9/2008 | Rosenfield et al. | 415/30 |

* cited by examiner

*Primary Examiner*—Eric S McCall
(74) *Attorney, Agent, or Firm*—Dale J. Davis; Ernest G. Cusick; Frank A. Landgraff

(57) ABSTRACT

A method and system of testing an overspeed protection system of a turbomachine. The method and system may include providing an overspeed protection system on a turbomachine that may have a single or multiple shafts; determining whether the speed the shaft or shaft(s) exceeds a shutdown value; changing an overspeed trip value of the turbomachine; and determining whether the overspeed protection system would operate to trip the turbomachine.

20 Claims, 4 Drawing Sheets

METHOD AND SYSTEM FOR TESTING AN OVERSPEED PROTECTION SYSTEM DURING A TURBOMACHINE SHUTDOWN SEQUENCE

BACKGROUND OF THE INVENTION

The present invention relates to a protection system of a turbomachine; and more particularly to a method and system for electronic overspeed protection on a turbomachine.

An overspeed condition occurs after the speed of a shaft on a turbomachine exceeds a specified range. During the overspeed condition, a turbomachine typically experiences severe mechanical and thermal stresses that can cause a catastrophic failure. An overspeed protection system protects the turbomachine by initiating an emergency shutdown (commonly called a trip) during an overspeed event.

Prior to testing the overspeed protection system, the turbomachine is customarily operating in a full-speed-no-load (FSNL) condition. FSNL is a condition where the turbomachine is at a normal operating speed and not exporting energy to a load such as a generator, compressor, or the like. An overspeed test typically involves manually raising the speed of a turbomachine above the normal operating range. For example, during an overspeed test some turbomachine operators raise the speed to 110% of the normal operating speed; thereafter the overspeed protection system should trip the turbine.

There are a few problems with the current method of overspeed testing. Manually adjusting the shaft speed introduces high thermal transients. A turbomachine trip at a speed near or above the normal operating speed can introduce large mechanical, electrical, and thermal stresses on the turbomachine components. These stresses decrease the maintenance interval and require turbomachine operators to shutdown the turbomachine for maintenance at a time sooner than planned. Moreover, after a trip, a re-start of a turbomachine is required, which delays the exporting of energy. Also, the current overspeed testing methods typically require that the turbomachine operate at FSNL, which typically does not generating revenue but consumes fuel and electricity. These problems drive turbomachine operators to avoid manual speed adjustments, trips, FSNL operation, and overspeed testing.

For the foregoing reasons, there is a need for a method and system for testing an overspeed protection system that does not trip the turbomachine at an operating speed that will introduce high thermal transients. The method should automatically adjust the speed during testing and should not require a turbomachine re-start after testing. Furthermore, the method should not require significant FSNL operation.

BRIEF DESCRIPTION OF THE INVENTION

In accordance with an embodiment of the present invention, a method of testing an overspeed protection system of a turbomachine includes providing an overspeed protection system on a turbomachine, the turbomachine comprising at least one shaft; determining whether the speed of at least one shaft exceeds a turbomachine shutdown value where the turbomachine could trip; changing an overspeed trip value of the turbomachine; and determining whether the overspeed protection system would operate to trip the turbomachine.

In accordance with another embodiment of the present invention, a system for testing an overspeed protection system of a turbomachine includes means for providing an overspeed protection system on a turbomachine, the turbomachine comprising at least one shaft; means for determining whether the speed of at least one shaft exceeds a turbomachine shutdown value where the turbomachine could trip; means for changing an overspeed trip set point; and means for determining whether the overspeed protection system would operate to trip the turbomachine.

DETAILED DESCRIPTION OF THE INVENTION

Figure 1A:
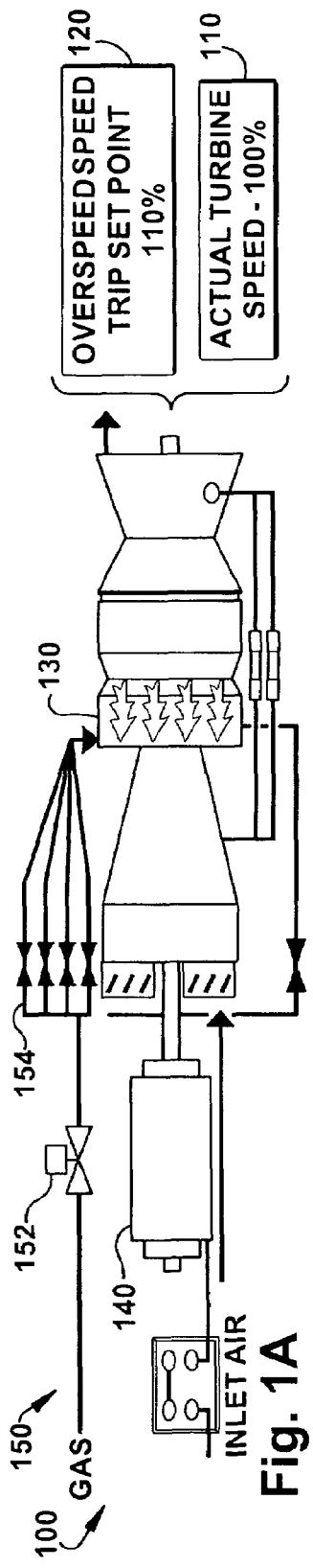
FIGS. 1A-1C (collectively FIG. 1) are schematics illustrating the environment in which an embodiment of the present invention operates.

As will be appreciated by one of ordinary skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system. " Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The following detailed description of preferred embodiments refers to the accompanying drawings, which illustrate specific embodiments of the invention. Other embodiments having different structures and operations do not depart from the scope of the present invention.

An embodiment of the present invention takes the form of a software application and process that automatically tests the overspeed protection system of a turbomachine while the turbomachine experiences a shutdown sequence. The present invention can be applied to many forms of turbomachines including combustion gas turbines, steam turbines, or the like.

The present invention may require that at least one test permissive is satisfied prior to the start of the fired shutdown overspeed test. These permissives may include a master protective trip state; a generator/driven load status; a fired shutdown status; and a flame detector status.

Figure 1B:
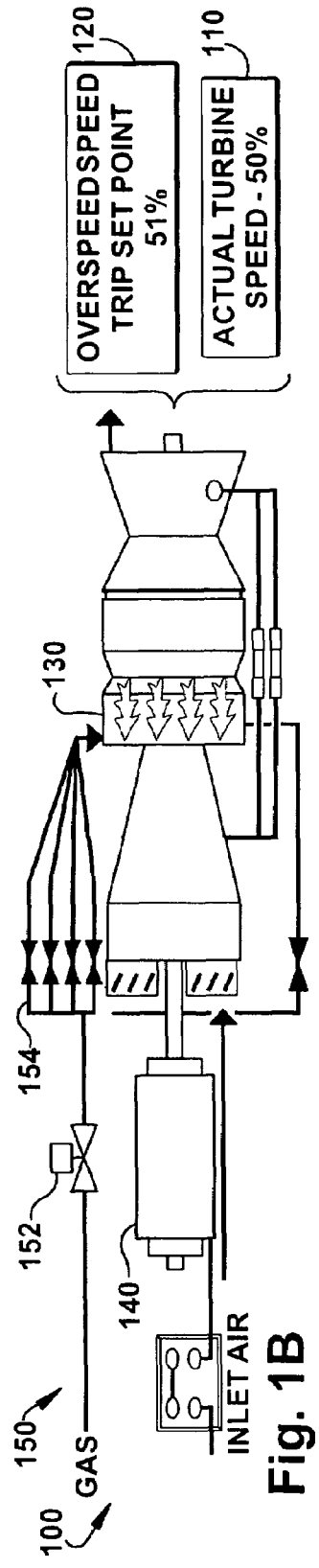
Figure 1C:
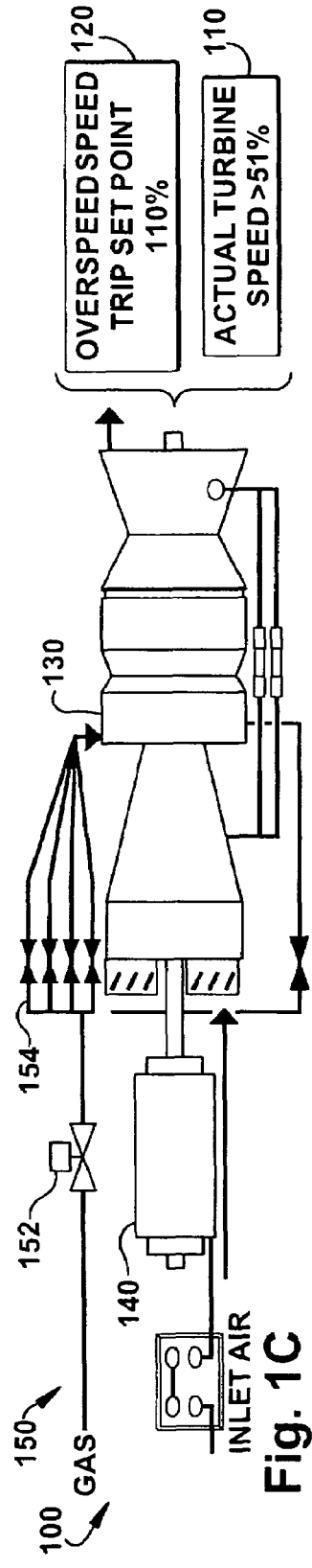

FIGS. 1A-1C (collectively FIG. 1) are screenshots illustrating the environment in which an embodiment of the present invention operates. FIG. 1 illustrates a combustion gas turbine (hereinafter turbine) 100 experiencing a shutdown sequence. FIG. 1 includes operational parameters of the turbine 100. These parameters include actual turbine speed 110 (as a percentage of normal operating speed); overspeed trip set point (as a percentage of normal operating speed) 120; flame detector 130; and generator output 140. FIG. 1 also illustrates a gas fuel system 150 having a stop/speed ratio valve 152, and a plurality of gas control valves 154.

Referring specifically to FIG. 1A, which illustrates that the actual turbine speed 110 is 100%, the overspeed trip set point 120 is 110%, flame detector 130 indicating flame and the generator output 140 is 0. These parameters suggest that the turbine 100 is operating in a FSNL condition.

After a fired shutdown is initiated and the test permissives(s) is satisfied, the user may commence the fired shutdown overspeed testing. FIG. 1B illustrates the turbine 100 experiencing a fire shutdown with the actual turbine speed 110 at 50% and flame detector 130 indicating flame. The present invention allows the user to manually abort the test, thereby resuming the fired shutdown on the turbine 100.

The fired shutdown overspeed test automatically adjusts the overspeed trip set point 120 to a value near the flameout speed of the turbine 100. Here, the set point 120 is lowered to 48%.

Soon after the set point 120 is changed, the overspeed protection system should trip the turbine 100, as illustrated in FIG. 1C. The trip of the turbine 100 rapidly stops the gas fuel flow to the turbine 100, thereby extinguishing the flame. FIG. 1C illustrates that the stop/speed ratio valve 152 and a plurality of gas control valves 154 are closed; and the flame detector 130 does not indicate a flame presence. After the turbine 100 trips, the overspeed trip set point 120 is automatically reset to a default value.

Figure 2A:
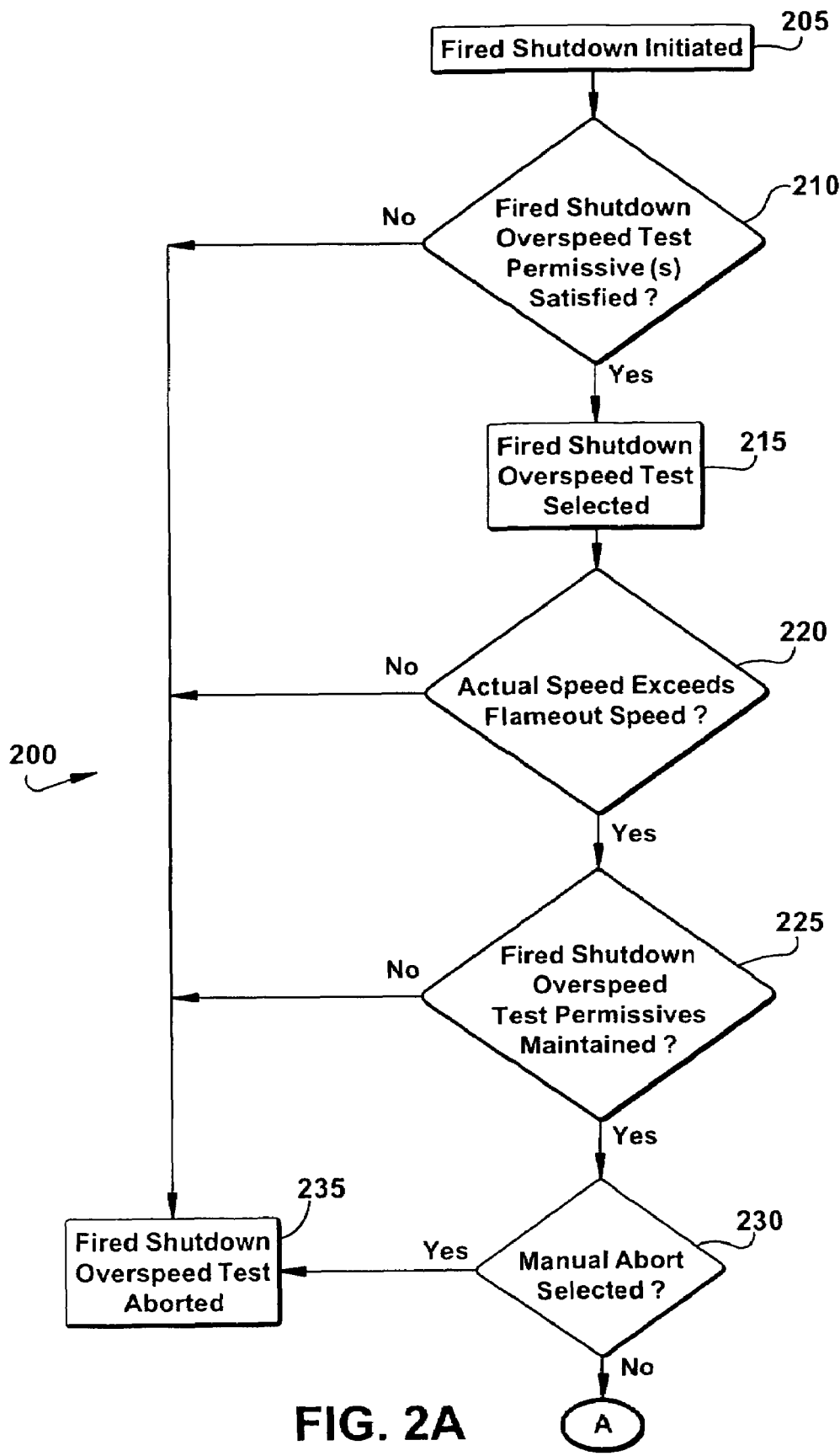
FIGS. 2A and 2B (collectively FIG. 2) are flowcharts illustrating an example of a method of testing an overspeed protection system during a turbomachine shutdown sequence in accordance with an embodiment of the present invention.
Figure 2B:
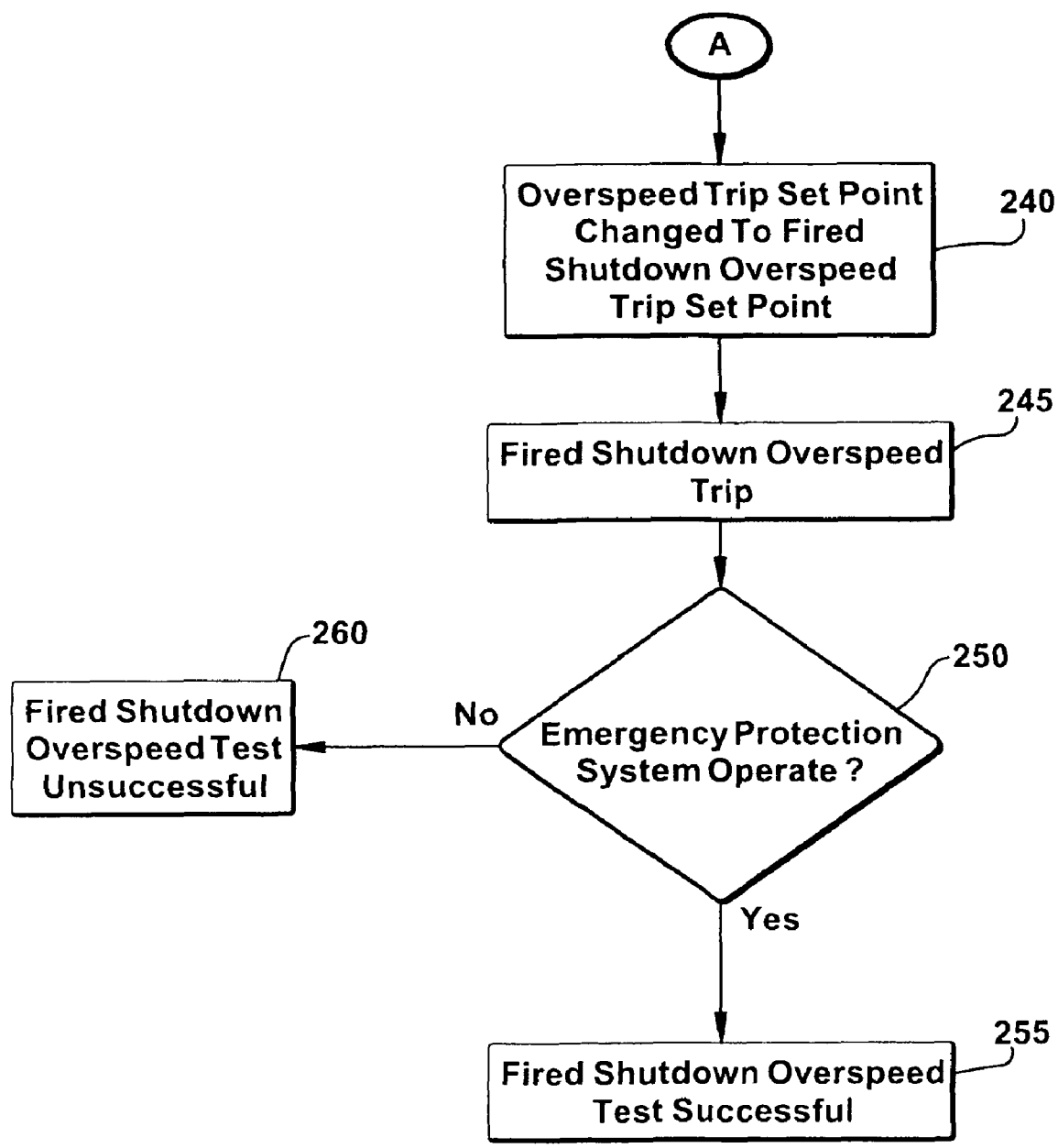

Referring now to FIGS. 2A and 2B (collectively FIG. 2), which are a flowchart illustrating a method 200 of testing an overspeed protection system during a turbine shutdown sequence, in accordance with an embodiment of the present invention. In step 205, a fired shutdown is initiated. The fired shutdown may be initiated manually by a turbomachine operator or automatically by a control system with requisite privileges.

In step 210, the method 200 determines whether at least one fired shutdown overspeed test permissive is satisfied. A user may configure a plurality of permissives that are prerequisites to testing. These permissives may be used to ensure a specific turbine operating state prior to testing. For example, a user may prefer that the turbine is operating at or near a FSNL state prior to commencing the testing. If a required testing permissive is not, then satisfied the method 200 proceeds to step 235; otherwise the method 200 proceeds to step 215.

In step 215, the fired shutdown overspeed test is selected. A user may configure the method 200 to automatically select the test after step 210 is satisfied. A user may desire this option if the operation of the turbine is conducted remotely. In the alternative, a user may prefer to manually select the test, which may be desirable if the operation of the turbine is conducted locally.

The method 200 proceeds to step 220, which determines whether or not the actual speed of at least one shaft exceeds the combustor flameout speed. The present invention may be applied to a turbine having a single shaft (commonly called a rotor) or a turbine having multiple shafts, including a two-shaft turbine. If the actual speed exceeds the flameout speed, then the method 200 proceeds to step 225; otherwise the method 200 proceeds to step 235. The present invention allows the user to configure a parameter for determining the combustor flameout speed. For example, a user may set the combustor flameout speed as a control constant. Alternatively, the present invention allows for the combustor flameout speed to be a variable automatically determined during testing.

The method 200, in step 225, determines whether the test permissive in step 210 is maintained. Operational events may cause the test permissive to change state. For example, a fuel system supply issue may lead to a premature flameout and loss of a test permissive. If the test permissive is not maintained, then the method 200 proceeds to step 235; otherwise the method 200 proceeds to step 230.

In step 230 the user may manually abort the test. A user may discover a reason, operationally or otherwise, for aborting the test. For example, a user may discover that a flame detector is not providing a reliable indication of flame status; and flame status may be an important requirement of the test. If the user aborts the test, then the method 200 proceeds to step 235; otherwise the method 200 proceeds to step 240.

In step 235, the method 200 aborts the test. After the test is aborted, the turbine operation reverts to the previous fired shutdown sequence. A user may configure the method 200 to provide a notification that the testing was aborted. The notification may be an alarm of varying forms such as, but not limited to, an audio signal, a graphic, or a text message.

In step 240, shown in FIG. 2B, the overspeed trip set point is changed to a fired shutdown trip set point. The value of the fired shutdown trip set point is influenced by a variety of mechanical, operational, and reliability factors. These factors may vary among combustion systems, operational conditions, and fuel types. The value is typically set to near the natural flame out speed of the particular combustion system, thereby minimizing the thermal transients associated with a trip. The present invention allows the user to input the fired shutdown trip set point value, thereby providing an adjustment means for specific conditions. Alternatively, the present invention may be configured to automatically generate and input a value for the fired shutdown trip set point.

After the overspeed trip set point is changed, the method 200 proceeds to step 245; where the turbine experiences a fired shutdown overspeed trip. The trip occurs after the actual speed of the turbine is near the fired shutdown overspeed set point.

The method 200, in step 250, determines whether the emergency protection system functioned correctly. In a combustion turbine, the emergency protection system generally operates to rapidly stop the fuel flow to the combustion system, thereby extinguishing combustion. Data recording means are typically used to verify that the emergency protection system components operated correctly. If the emergency protection system functioned correctly, then the method 200 proceeds to step 255, where the fired shutdown test is successful; otherwise the method 200 proceeds to step 260, where the fired shutdown test is unsuccessful. The present invention may be integrated with an alarm system that notifies the user whether or not the emergency protection system functioned correctly.

While the present invention has been described with respect to a single shaft combustion turbine in FIGS. 2A and 2B, those skilled in the art will recognize that the features of the present invention may be equally applied to other forms of turbomachines, such as steam turbines and the like.

Figure 3:
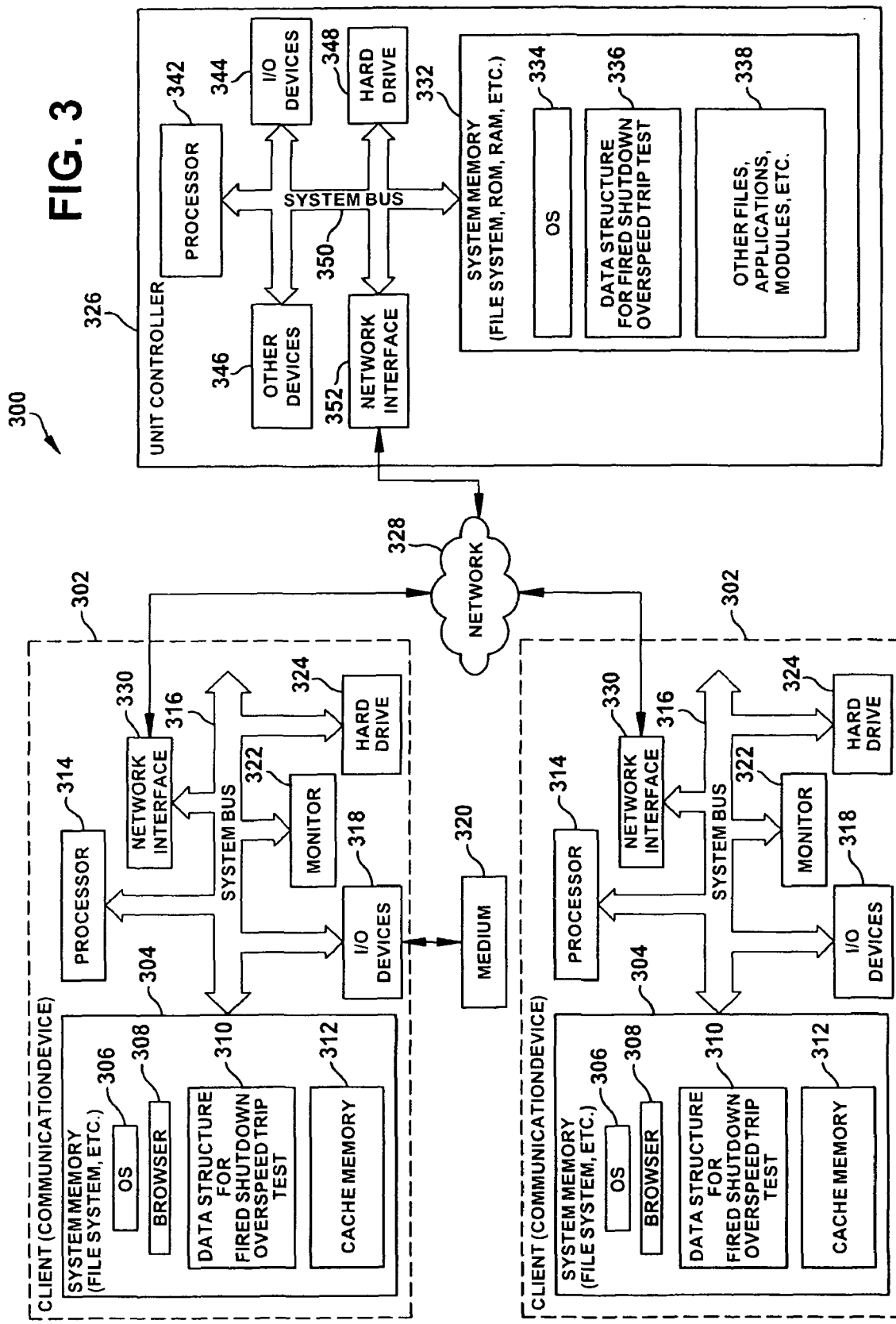
FIG. 3 is a block diagram of an exemplary system for testing an overspeed protection system during a turbomachine shutdown sequence in accordance with an embodiment of the present invention.

FIG. 3 is a step diagram of an exemplary system 300 to automatically test the overspeed protection system of a turbomachine in accordance with an embodiment of the present invention. The elements of the method 200 may be embodied in and performed by the system 300. The system 300 may include one or more user or client communication devices 302 or similar systems or devices (two are illustrated in FIG. 3). Each communication device 302 may be a computer system, a personal digital assistant, a cellular phone, or similar device capable of sending and receiving an electronic message.

The communication device 302 may include a system memory 304 or local file system. The system memory 304 may include a read only memory (ROM) and a random access memory (RAM). The ROM may include a basic input/output system (BIOS). The BIOS may contain basic routines that help to transfer information between elements or components of the communication device 302. The system memory 304 may contain an operating system 306 to control overall operation of the communication device 302. The system memory 304 may also include a browser 308 or web browser. The system memory 304 may also include data structures 310 or computer-executable code to automatically test the overspeed protection system of a turbomachine that may be similar or include elements of the method 200 in FIGS. 2A and 2B. The system memory 304 may further include a template cache memory 312, which may be used in conjunction with the method 200 in FIGS. 2A and 2B to automatically store data from the most recent test.

The communication device 302 may also include a processor or processing unit 314 to control operations of the other components of the communication device 302. The operating system 306, browser 308, data structures 310 may be operable on the processor 314. The processor 314 may be coupled to the memory system 304 and other components of the communication device 302 by a system bus 316.

The communication device 302 may also include multiple input devices, output devices or combination input/output devices 318. Each input/output device 318 may be coupled to the system bus 316 by an input/output interface (not shown in FIG. 3). The input and output devices or combination I/O devices 318 permit a user to operate and interface with the communication device 302 and to control operation of the browser 308 and data structures 310 to access, operate and control the software to automatically test the overspeed protection system of a turbomachine. The I/O devices 318 may include a keyboard and computer pointing device or the like to perform the operations discussed herein.

The I/O devices 318 may also include disk drives, optical, mechanical, magnetic, or infrared input/output devices, modems or the like. The I/O devices 318 may be used to access a medium 320. The medium 320 may contain, store, communicate or transport computer-readable or computer-executable instructions or other information for use by or in connection with a system, such as the communication devices 302.

The communication device 302 may also include or be connected to other devices, such as a display or monitor 322. The monitor 322 may be used to permit the user to interface with the communication device 302. The monitor 322 present images, graphics, or the like, similar to the schematics illustrated in FIGS. 1A-1C that may be generated by the data structures 310 for automatically testing the overspeed protection system of a turbomachine.

The communication device 302 may also include a hard disk drive 324. The hard drive 324 may be coupled to the system bus 316 by a hard drive interface (not shown in FIG. 3). The hard drive 324 may also form part of the local file system or system memory 304. Programs, software and data may be transferred and exchanged between the system memory 304 and the hard drive 324 for operation of the communication device 302.

The communication devices 302 may communicate with a remote server 326 and may access other servers or other communication devices similar to communication device 302 via a network 328. The system bus 316 may be coupled to the network 328 by a network interface 330. The network interface 330 may be a modem, Ethernet card, router, gateway or the like for coupling to the network 328. The coupling may be a wired connection or wireless. The network 328 may be the Internet, private network, an intranet or the like.

The server 326 may also include a system memory 332 that may include a file system, ROM, RAM and the like. The system memory 332 may include an operating system 334 similar to operating system 306 in communication devices 302. The system memory 332 may also include data structures 336 to automatically test the overspeed protection system of a turbomachine. The data structures 336 may include operations similar to those described with respect to the method 200 for automatically testing the overspeed protection system of a turbomachine. The server system memory 332 may also include other files 338, applications, modules and the like.

The server 326 may also include a processor 342 or a processing unit to control operation of other devices in the server 326. The server 326 may also include I/O device 344. The I/O devices 344 may be similar to I/O devices 318 of communication devices 302. The server 326 may further include other devices 346, such as a monitor or the like to provide an interface along with the I/O devices 344 to the server 326. The server 326 may also include a hard disk drive 348. A system bus 350 may connect the different components of the server 326. A network interface 352 may couple the server 326 to the network 328 via the system bus 350.

The flowcharts and step diagrams in the Figures illustrate the architecture, functionality, and operation of possible implementations of systems, methods and computer program products according to various embodiments of the present invention. In this regard, each step in the flowchart or step diagrams may represent a module, segment, or portion of code, which comprises one or more executable instructions for implementing the specified logical function(s). It should also be noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved. It will also be noted that each step of the block diagrams and/or flowchart illustration, and combinations of steps in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of testing an overspeed protection system of a turbomachine, the method comprising: providing an overspeed protection system on the turbomachine, the turbomachine comprising at least one shaft; determining whether the speed of at least one shaft exceeds a turbomachine shutdown value where the turbomachine could trip; changing an overspeed trip value of the turbomachine from an overspeed trip setpoint to a shutdown trip setpoint; and determining whether the overspeed protection system would operate to trip the turbomachine.

2. The method of claim 1, wherein the turbomachine is a combustion turbine and the method further comprises: determining whether at least one predetermined testing permissive is satisfied; initiating a fired shutdown overspeed test; aborting the fired shutdown overspeed test if the speed of at least one shaft does not exceeds a flameout speed; and changing an overspeed trip set point to a fired shutdown trip set point.

3. The method of claim 2, wherein an emergency protection. system controls at least one combustion turbine fuel system.

4. The method of claim 3, further comprising: aborting the fired shutdown overspeed test if the at least one testing permissive is not maintained.

5. The method of claim 4, further comprising: determining whether the emergency protection system controls the operation of the combustion turbine.

6. A system for testing an overspeed protection system of a turbomachine, the system comprising: means for providing an overspeed protection system on a turbomachine, the turbomachine comprising at least one shaft; means for determining whether the speed of at least one shaft exceeds a turbomachine shutdown value where the turbomachine could trip; means for changing an overspeed trip set point from an overspeed trip setpoint to a shutdown trip setpoint; and means for determining whether the overspeed protection system would operate to trip the turbomachine.

7. The system of claim 6, wherein the turbomachine is a combustion turbine and the system further comprises: means for determining whether at least one testing permissive is satisfied; means for initiating a fired shutdown overspeed test;
means for aborting the fired shutdown overspeed test if the speed of at least one shaft does not exceeds a flameout speed; and means for changing an overspeed trip set point to a fired shutdown trip set point.

8. The system of claim 7, wherein an emergency protection system controls at least one combustion turbine fuel system.

9. The system of claim 8, further comprising: means for aborting the fired shutdown overspeed test if the at least one testing permissive is not maintained.

10. The system of claim 9, further comprising: means for determining whether the emergency protection system controls the operation of the combustion turbine.

11. A method of testing an overspeed protection system of a turbomachine, the method comprising: providing an overspeed protection system on a turbomachine, the turbomachine comprising at least one shaft; determining whether at least one predetermined testing permissive is satisfied; initiating a fired shutdown overspeed test; aborting the fired shutdown overspeed test if the speed of at least one shaft does not exceeds a flameout speed; and changing an overspeed trip set point to a fired shutdown trip set point.

12. A system for testing an overspeed protection system of a turbomachine, the system comprising: means for providing an overspeed protection system on a turbomachine, the turbomachine comprising at least one shaft; means for determining whether at least one testing permissive is satisfied; means for initiating a fired shutdown overspeed test; means for aborting the fired shutdown overspeed test if the speed of at least one shaft does not exceeds a flameout speed; and means for changing an overspeed trip set point to a fired shutdown trip set point.

13. A method of testing an overspeed protection system of a turbomachine, the method comprising: providing an overspeed protection system on the turbomachine, the turbomachine comprising at least one shaft; determining whether the speed of at least one shaft exceeds a turbomachine shutdown value where the turbomachine could trip; changing an overspeed trip value of the turbomachine; determining whether the overspeed protection system would operate to trip the turbomachine; determining whether at least one predetermined testing permissive is satisfied; initiating a fired shutdown overspeed test; aborting the fired shutdown overspeed test if the speed of at least one shaft does not exceeds a flameout speed; and changing an overspeed trip set point to a fired shutdown trip set point.

14. The method of claim 13, wherein an emergency protection system controls at least one combustion turbine fuel system.

15. The method of claim 14, further comprising: aborting the fired shutdown overspeed test if the at least one testing permissive is not maintained.

16. The method of claim 15, further comprising: determining whether the emergency protection system controls the operation of the combustion turbine.

17. A system for testing an overspeed protection system of a turbomachine, the system comprising: means for providing an overspeed protection system on a turbomachine, the turbomachine comprising at least one shaft; means for determining whether the speed of at least one shaft exceeds a turbomachine shutdown value where the turbomachine could trip; means for changing an overspeed trip set point; means for determining whether the overspeed protection system would operate to trip the turbomachine; means for determining whether at least one testing permissive is satisfied; means for initiating a fired shutdown overspeed test; means for aborting the fired shutdown overspeed test if the speed of at least one shaft does not exceeds a flameout speed; and means for changing an overspeed trip set point to a fired shutdown trip set point.

18. The system of claim 17, wherein an emergency protection system controls at least one combustion turbine fuel system.

19. The system of claim 18, further comprising: means for aborting the fired shutdown overspeed test if the at least one testing permissive is not maintained.

20. The system of claim 19, further comprising: means for determining whether the emergency protection system controls the operation of the combustion turbine.

* * * * *